Patented Nov. 8, 1938

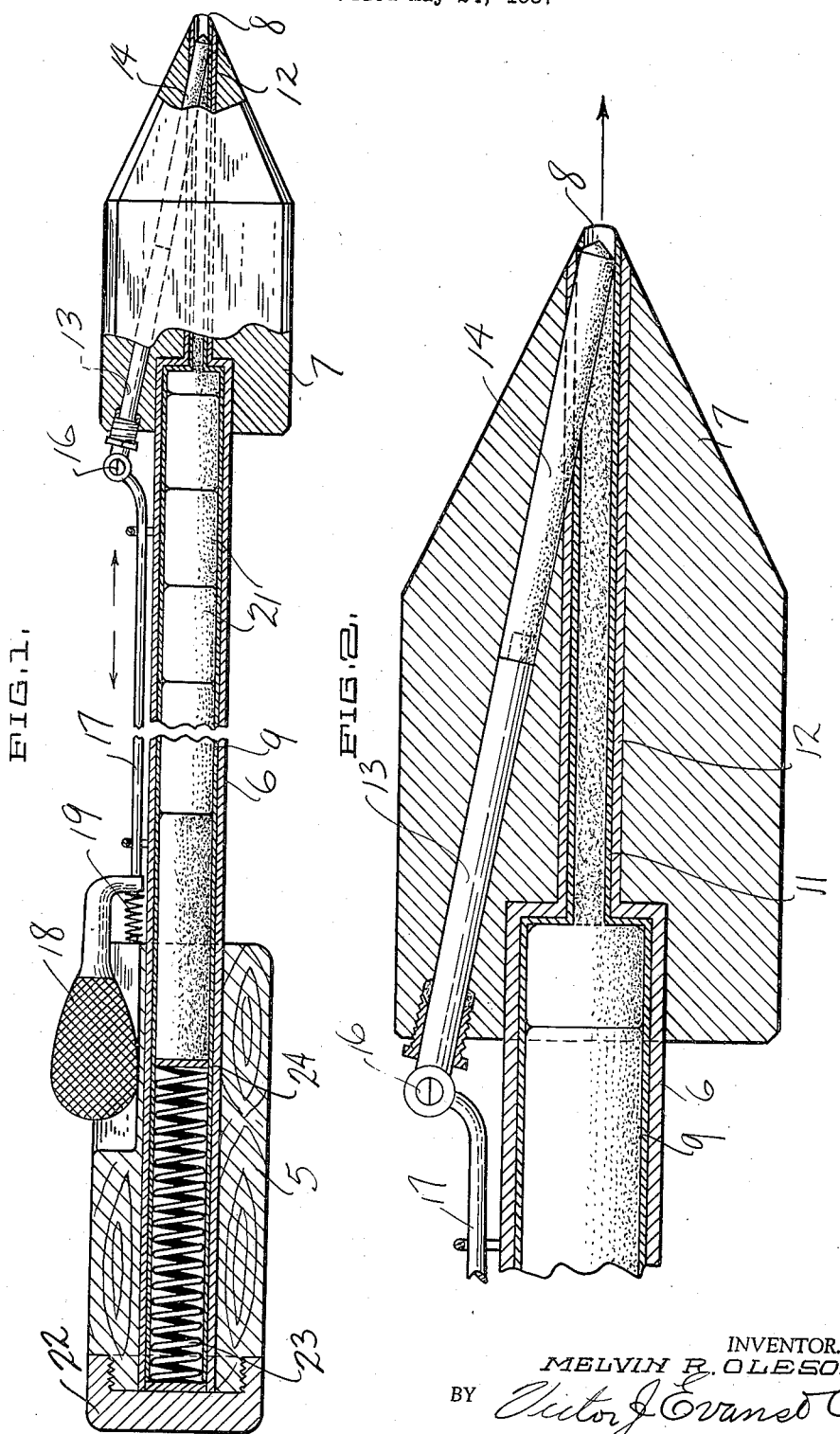

2,135,764

UNITED STATES PATENT OFFICE 2,135,764

SOLDERING IRON

Melvin R. Oleson, Visalia, Calif.

Application May 24, 1937, Serial No. 144,517

1 Claim. (Cl. 113—109)

This invention relates to improvements in soldering irons, and has particular reference to a soldering iron wherein the solder will be fed to the iron from a point within the iron during the soldering operation, in counter-distinction to the usual method wherein a strip of solder is held against the outside of the iron which act requires two hands in order to complete the work.

A further object of the invention is to produce a device of this character which is simple in construction and economical to manufacture.

A further object of the invention is to produce a device of this character wherein the melted solder within the iron will not stick or cause sticking of the valve to the solder releasing element.

Other objects and advantages will be apparent during the course of the following description.

In the accompanying drawing forming a part of this specification and in which like numerals are employed to designate like parts throughout the same, Fig. 1 is a side elevation of my device, a portion thereof being shown in cross section; and Fig. 2 is an enlarged fragmentary detail view of the head of the iron, also shown in cross section.

It has been common practice to employ a soldering iron which in reality is a handle with a copper soldering point attached thereto, to heat this copper point in any desired manner and to then hold the point against the work to be soldered, and at the same time apply solder to the point of the iron, which solder melts and flows upon the work which has been prepared to receive it. This operation requires the holding of the iron with one hand so that the point thereof is against the work, and to then apply solder to the point of the iron with the other hand. With my improved iron the operation can be performed with one hand, leaving the other hand free for other uses.

In the accompanying drawing wherein for the purpose of illustration is shown a preferred embodiment of my invention, the numeral 5 designates a handle in which is secured a tube 6, to which tube is secured the copper head 7 having a soldering point 8. The tube 6 is lined, as shown at 9, and for this lining I employ a material to which solder will not adhere, such a material as a matter of example being carbon. This lining 9 joins a similar lining 11 in the tube 12, which tube 12 communicates with the tube 6 and has its outlet end at the point 8. A valve plunger 13 has a carbon end 14 which extends into the bore of the tube 12 and its lining 11, and acts as a valve to shut off the flow of solder through this tube and its lining. This plunger 13 is connected, as at 16, to a rod 17 slidable on the tube 6 and actuated by a thumb piece 18. A spring 19 normally holds the parts in the position of Fig. 1. In use I place a number of solder slugs 21 in the tube 6 by removing the cap 22 and the spring 23 together with the plunger 24. Therefore, when the iron is ready for use, as shown in Fig. 1, the head may be heated in any desired manner, which heat will be sufficient to melt the lowermost slug, allowing the solder to flow through the tube 12 until it engages the carbon valve 14.

Assuming now that it is desired to perform a soldering operation and that the iron has been previously heated, the operator grasps the iron by the handle 5 and pushes upon the thumb piece 18, in the drawing, against the spring 19, thus drawing the plunger 13 and the carbon valve 14 toward the left of the drawing which opens the passage so that the melted solder may flow to the point 8. Thus it will be seen that my device will feed solder to the point of the iron as long as the iron is heated and whenever the valve is opened, and furthermore, solder will always flow due to the fact that the tube and passage through the head are lined with a solder repellent material to which the solder will not adhere.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a soldering iron, a slotted handle, a tube extending therefrom, a head carried by the opposite end of said tube from that engaging said handle, said tube having a solder resistant lining and capable of holding a plurality of solder slugs therein, a spring urged plunger positioned in said tube in the rear of said slugs, an axially disposed passage extending through said head and communicating at the tip thereof with said tube, said passage being lined with a solder resistant material, valve means associated with said head for controlling the flow of solder through said passage from said lined tube, said valve means including a spring pressed rod having a thumb piece slidable in said slotted handle, and an angularly disposed valve plunger of solder resistant material capable of closing the outlet passage at the point of the head of said iron, whereby the slugs arranged in said tube will be automatically forced to the head of the iron and the flow of the molten solder is gauged by the manipulation of said valve.

MELVIN R. OLESON.